(12) United States Patent
Johnson

(10) Patent No.: US 6,437,707 B1
(45) Date of Patent: Aug. 20, 2002

(54) DETECTING A LOW PERFORMANCE TAKEOFF CONDITION FOR AIRCRAFT FOR USE WITH GROUND PROXIMITY WARNING SYSTEMS

(75) Inventor: Steven C. Johnson, Issaquah, WA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/912,093

(22) Filed: Jul. 23, 2001

Related U.S. Application Data

(60) Provisional application No. 60/220,257, filed on Jul. 24, 2000.

(51) Int. Cl.$^7$ .................................................. G08G 5/00
(52) U.S. Cl. ..................... 340/959; 73/178 T; 340/961; 340/970; 701/14; 701/15
(58) Field of Search ................. 340/970, 977, 340/963, 961, 945; 342/65; 701/301, 4, 5, 7, 8, 9, 14, 15, 18, 120; 73/178 T; 244/180, 181

(56) References Cited

U.S. PATENT DOCUMENTS

| | | | |
|---|---|---|---|
| 3,614,728 A | * | 10/1971 | Borrok et al. |
| 3,681,580 A | * | 8/1972 | Gwathmey et al. ............ 244/77 |
| 3,934,222 A | * | 1/1976 | Bateman et al. ........... 73/178 R |
| 5,442,556 A | * | 8/1995 | Boyes et al. |
| 5,488,563 A | * | 1/1996 | Chazelle et al. ............. 340/970 |
| 5,892,462 A | * | 4/1999 | Tran ............................. 340/961 |
| 6,347,263 B1 | * | 2/2002 | Johnson et al. .............. 340/970 |

* cited by examiner

Primary Examiner—Brent A. Swarthout

(57) ABSTRACT

The present invention includes a system, method and computer program product for reducing nuisance warnings during low performance takeoff conditions. The system includes a first component that determines aircraft current climb rate and potential climb rate based on aircraft vertical speed data and velocity information and a second component that adds the determined current climb rate and potential climb rate. The system also includes a third component that disables alerts, if the sum of the current climb rate and potential climb rate differ from a predetermined climb rate by a threshold amount and if the aircraft is supposed to be in a maximum thrust condition (e.g. takeoff, missed approach).

12 Claims, 3 Drawing Sheets

DETECTING A LOW PERFORMANCE TAKEOFF CONDITION FOR AIRCRAFT FOR USE WITH GROUND PROXIMITY WARNING SYSTEMS

CROSS-REFERENCE TO RELATED APPLICATIONS

This application claims priority from co-pending U.S. application Ser. No. 60/220,257, titled "Detecting A Low Performance Takeoff Condition For Aircraft For Use With Ground Proximity Warning Systems," filed Jul. 24, 2000, the entire contents of which are incorporated herein by reference.

BACKGROUND OF THE INVENTION

Enhanced Ground Proximity Warning Systems (EGPWS), such as that produced by Honeywell, include look-ahead algorithms that were designed assuming all engines climb performance availability. This includes a minimum 6-degree climb gradient for the look-ahead threat algorithm. This number was chosen to represent the minimum all engines operating climb capability of modem air transport category aircraft. In addition, the recommended recovery procedure from a hard EGPWS Pull-up aural alert is a straight-ahead pitch up to best available climb angle.

This works well under normal operating conditions but not in case of an engine out condition on takeoff where the certified minimum climb gradient can be as low as 2.4%. To make matters worse some engine out procedures, especially in mountain valleys, require the aircraft to turn shortly after takeoff since with the degraded climb performance the aircraft cannot out climb the terrain ahead.

Therefore, during these engine out departures the current EGPWS may not provide the desired response. Due to the lower allowed terrain clearances and the close maneuvering to terrain EGPWS alerts may be given. EGPWS Caution alerts are still desirable but hard Pull-up alerts are a concern since in most cases the standard EGPWS recovery maneuver should NOT be performed since the aircraft may not be able to out climb the terrain. Pilot reaction to the alert may put the aircraft in a degraded climb performance situation. In other words, FAA aircraft certification requirements require aircraft manufacturers to design aircraft that can meet minimum climb-out restrictions even in an engine out situation. Therefore, deviating from flying the best engine out climb performance procedures can only increase the danger of impacting a departure obstacle (ground, radio tower). Instead, the pilot should stick to the prescribed engine out procedure.

In one system that tries to solve this problem, the system modifies the minimum 6-degree climb angle used for alert calculations. Unfortunately, in the case of the engine out condition decreasing the assumed climb angle will in most cases just increase the changes of getting a nuisance alarm.

What is needed then is both a method for detecting the loss of performance condition and changes to the EGPWS alerting algorithm.

Before we can modify the look-ahead algorithms, we must be able to detect the loss of an engine on takeoff. The prior system above required a signal from the aircraft to indicate when an engine failure had occurred as well as numerous stored aerodynamic parameters. Unfortunately, this results in complex aircraft interfacing problems as well as significant data gathering to obtain the proper parameters.

Therefore, there is a need to come up with a method that reduces the burden and cost for determining an engine failure condition.

SUMMARY OF THE INVENTION

The present invention includes a system; method and computer program product for reducing nuisance warnings during low performance takeoff conditions. The system includes a first component that determines aircraft current climb rate and potential climb rate based on aircraft vertical speed data and velocity information and a second component that adds the determined current climb rate and potential climb rate. The system also includes a third component that disables alerts, if the sum of the current climb rate and potential climb rate differ from a predetermined climb rate by a threshold amount and if the aircraft is supposed to be in a maximum thrust condition (e.g. takeoff, missed approach).

In accordance with further aspects of the invention, the predetermined climb rate is based on all engine maximum thrust operation.

In accordance with other aspects of the invention, the all engine maximum thrust operation is based on a drag component, a weight component, and an all engines at maximum thrust component.

As will be readily appreciated from the foregoing summary, the invention provides a system that uses previously generated values to assess engine operation and provide alerts according to engine operation status.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
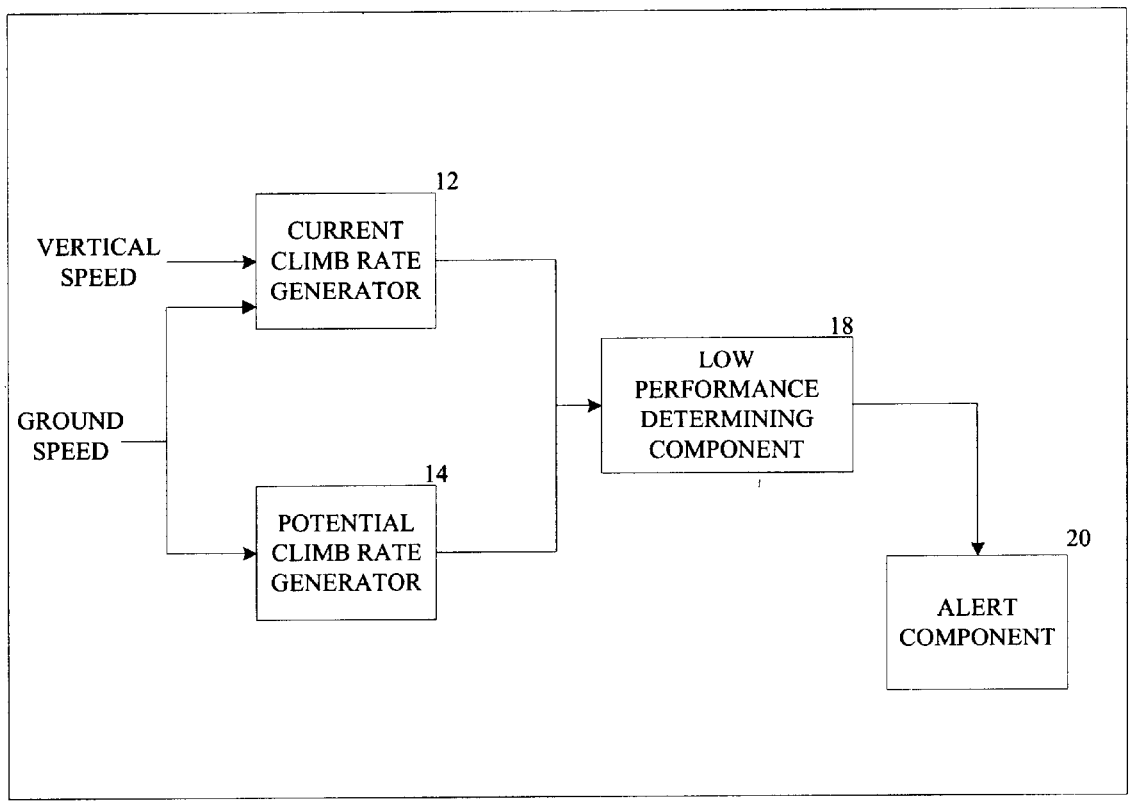
FIG. 1 is a block diagram of components of a warning system for performing the present invention.

The present invention is a system, method, and computer program product for reducing nuisance warnings during takeoff or a maximum thrust condition (i.e., missed approach) when an aircraft is experiencing lower than normal engine performance. As shown in FIG. 1, an aircraft flight safety system 10, such as an Enhanced Ground Proximity Warning System produced by Honeywell, Inc., includes components for using already generated flight data for determining if an aircraft is not performing to its maximum thrust potential. The system 10 includes a current climb rate generator 12, a potential climb rate generator 14, a low performance determining component 18, and an alert component 20.

The current climb rate generator 12 and the potential climb rate generator 14 are coupled to the low performance determining component 18, and the low performance determining component 18 is coupled to the alert component 20. The current climb rate generator 12 receives an aircraft vertical speed value and a ground speed value from other aircraft system components, such as a vertical speed indicator, a global positioning system (GPS), a flight management system (FMS), or other aircraft avionics equipment. From the two entered values, the current climb rate generator 12 generates a current climb rate value. The potential climb rate generator 14 receives only ground speed information, generates a potential climb rate value of the aircraft using the ground speed information, and sends the generated potential climb rate value to the low performance-determining component 18. The low performance-determining component 18 receives the current climb rate value and the potential climb rate values from the generators 14 and 12. The low performance determining component 18 using the received value determines if the aircraft is in a low performance condition with respect to either max determined thrust during an all engine operation condition or based on best available combined climb rate of the current climb rate value and the potential climb rate value. Below are described various embodiments better performed by the low performance determining component 18.

If the low performance-determining component 18 determines from the received prime rate values that the aircraft is in a low performance condition it will then send a signal to the alert component 20. A low performance-determining component 18 is activated only during a maximum thrust condition. In other words the aircraft must be at full throttles in order for the component 18 to be enabled to perform its task of determining if the aircraft is experiencing low performance. Many commercial aircraft include a take-off and go-around (toga) switch that acts as the enabler for the component 18, because when the toga switch is activated the aircraft should be at max available thrust in an all engine operation condition. Alternately, throttle lever position or engine parameters such as N1 could be used.

If the alert component 20 receives a signal from the low performance determining component 18 that a low performance condition exists in an all engine maximum thrust expectation, the alert component will disable various alerts, such as "pull-up" alert. The low performance determining component 18 can determine if the received current climb rates value and potential climb rate value are commiserate with an engine out condition. If so, it is most likely that the flight crew is more concerned with maintaining max performance for the single engine or less than full engine operation conditions than with any worries about close proximity to the ground. Alert component 20 normally generates audible and visual warnings if the aircraft is within parameters of a prestored database of the ground. If in a condition where it is determined that the aircraft is not experiencing full power or in other words an engine is out, then sending a pull-up alert to the flight crew may cause the flight crew to ignore their present condition or their present operation of the aircraft with respect to handling the emergency related to the engine out condition and react to the pull-up alert. By reacting to the pull-up alert the flight crew could quite easily pull the aircraft into a stall or into the backside of the flight curve and thus reduce the aircrafts present climb rate causing the aircraft to be even closer to hitting an obstacle identified in the alert component 20. Since aircraft manufacturers are required to meet missed approach and take off procedures for both normal operation and for engine out conditions, there is a reasonable expectation that as long as the flight crew maintains proper handling of the engine out condition emergency then the aircraft will perform as expected and be clear of all obstacles on the departure.

Figure 2:
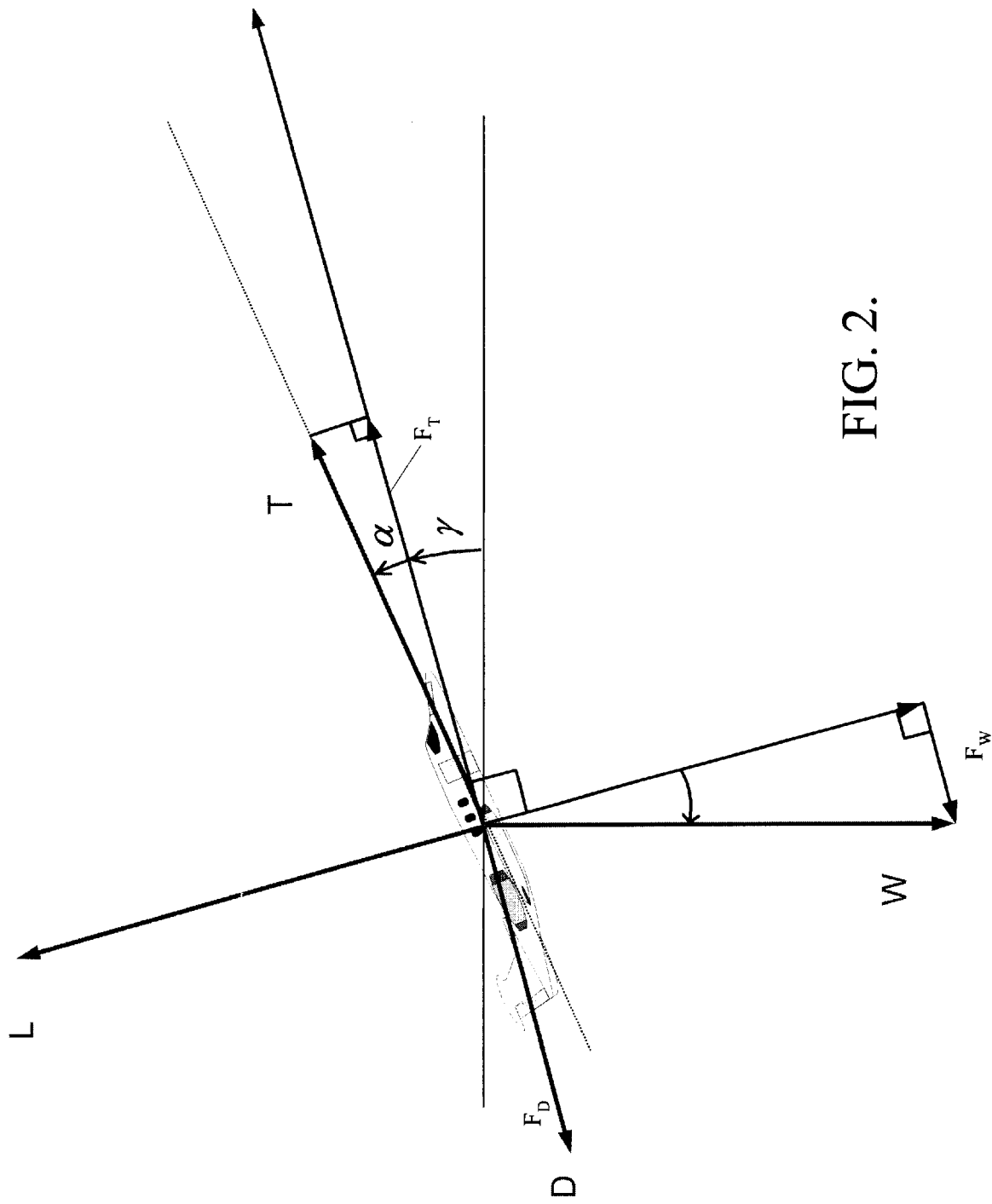
FIG. 2 is a force diagram of a climbing aircraft.

FIG. 2 illustrates the forces on a climbing aircraft. L is aircraft lift, D is aircraft drag, T is aircraft thrust, and W is aircraft weight. The present invention uses the known values of FIG. 2 to generate an all engine maximum thrust climb rate value or specific excess power value of the aircraft. First, the present invention begins with the equation F=ma for defining the relationship of forces in FIG. 1 and proceeds in the following equations.

$$ma = F_T - F_D - F_W \quad (1)$$

$$\frac{w}{g}\frac{dV}{dt} = T\cos\alpha - D - W\sin\gamma \quad (2)$$

For small $\alpha$ Equation 2 becomes:

$$\frac{w}{g}\frac{dV}{dt} + W\sin\gamma = T - D \quad (3)$$

$$\frac{1}{g}\frac{dV}{dt} + \sin\gamma = \frac{T-D}{W} \quad (4)$$

$$\frac{1}{g}\frac{dV}{dt} + \frac{1}{V}\frac{dh}{dt} = \frac{T-D}{W} \quad (5)$$

The right side of Equation 5 provides the all engine maximum thrust climb rate value. This is a predetermined value because thrust, drag, and weight are known before system operation. The thrust is all engine maximum thrust. The drag is based on aircraft's flight configuration (i.e., half flaps, no flaps, gear up, gear down, etc.). The weight is the empty weight, a preset weight based on possible loads, or a weight based on present cargo and passenger loads.

Figure 3:
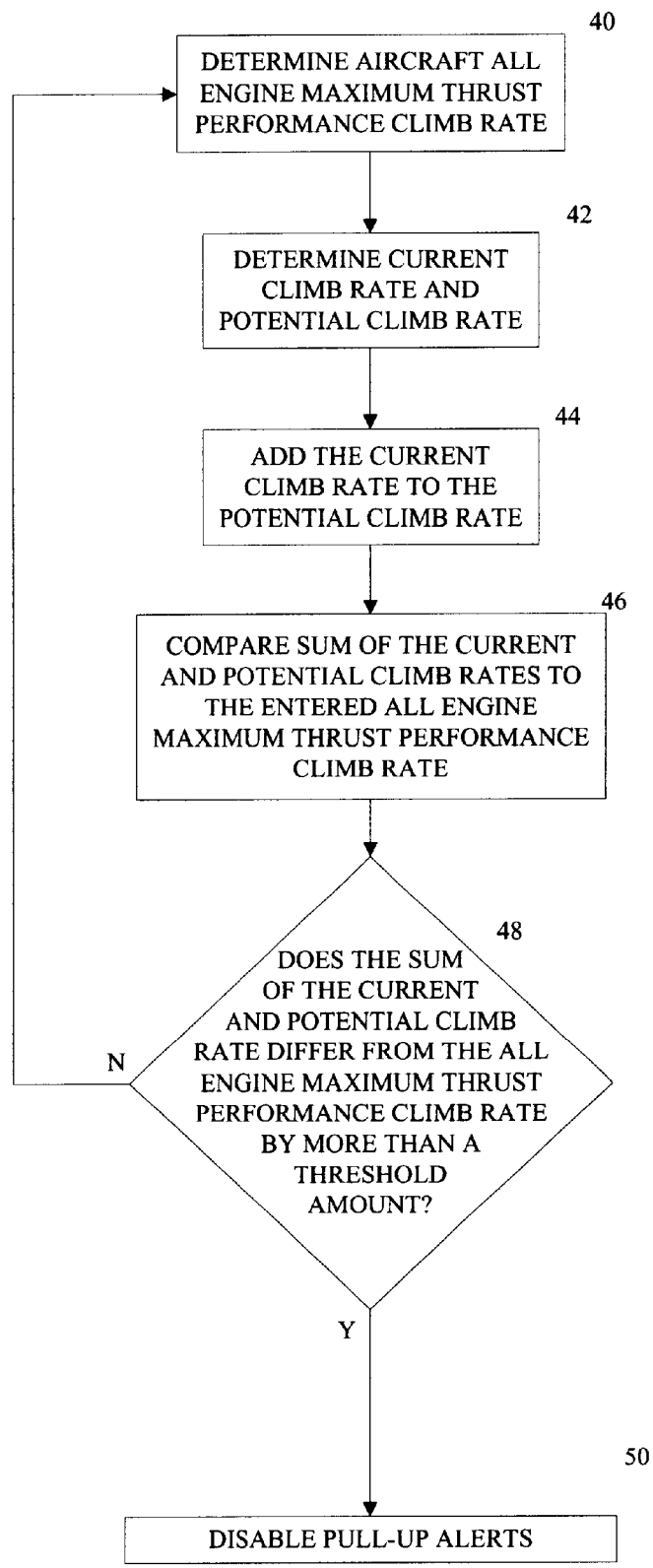
FIG. 3 is a flow diagram of a preferred process performed by the components shown in FIG. 1.

FIG. 3 illustrates a preferred process performed by the present invention in order to disable pull-up alerts if the aircraft is performing below the all engine maximum thrust climb rate value. First, at block 40, the process determines the aircraft all engine maximum thrust performance climb rate value. The aircraft all engine maximum thrust performance climb rate value is predetermined as described above. Next, at block 42, the process determines current climb rate and potential climb rate of the aircraft. The current climb rate value and potential climb rate value are determined using only aircraft velocity and climb rate that are already supplied by other aircraft systems. Then, at block 44, the current climb rate value is added to the potential climb rate value. At block 46, the process compares the sum of the current and potential climb rate values to the entered all engine maximum thrust performance climb rate. At decision block 48, the process determines if the sum of the current and potential climb rate differ from the all engine maximum thrust performance climb rate by more than a threshold amount for a period of time. If the sum of the current and potential climb rate differ from the all engine maximum thrust performance climb rate by more than a threshold amount for a period of time (and it has been determined that the aircraft is in a takeoff or maximum thrust condition), the process disables pull-up alerts that would normally be generated by the EGPWS during mode 1 operation (high descent near ground), mode 2 operation (radio altimeter), or look-algorithm operation.

In an alternate embodiment, if the sum of the aircraft's current and potential climb rate is below a preset climb rate, wherein the preset climb rate is less than the all engine maximum thrust performance climb rate, then the pull-up alerts are disabled. For example, if the all engine maximum thrust performance climb rate corresponds to a 6 degree climb angle, then the preset climb rate corresponds to something less, such as a 3 degree climb angle. In this example, if the sum corresponds to a climb angle less than 3 degrees, the aircraft is assumed to be experiencing low performance.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A ground proximity warning method comprising:

determining aircraft current climb rate and potential climb rate based on aircraft vertical speed data and velocity information;

adding the determined current climb rate and potential climb rate; and disabling alerts, if the sum of the current climb rate and potential climb rate differ from a predetermined climb rate by a threshold amount.

2. The method of claim 1, wherein the predetermined climb rate is based on all engine maximum thrust operation.

3. The method of claim 2, wherein the all engine maximum thrust operation is based on a drag component, a weight component, and an all engines at maximum thrust component.

4. A ground proximity warning system comprising:

a means for determining aircraft current climb rate and potential climb rate based on aircraft vertical speed data and velocity information;

a means for adding the determined current climb rate and potential climb rate; and a means for disabling alerts, if the sum of the current climb rate and potential climb rate differ from a predetermined climb rate by a threshold amount.

5. The system of claim 4, wherein the predetermined climb rate is based on all engine maximum thrust operation.

6. The system of claim 5, wherein the all engine maximum thrust operation is based on a drag component, a weight component, and an all engines at maximum thrust component.

7. A ground proximity warning system computer program product comprising:

a component configured to determine aircraft current climb rate and potential climb rate based on aircraft vertical speed data and velocity information;

a component configured to add the determined current climb rate and potential climb rate; and a component configured to disable alerts, if the sum of the current climb rate and potential climb rate differ from a predetermined climb rate by a threshold amount.

8. The product of claim 7, wherein the predetermined climb rate is based on all engine maximum thrust operation.

9. The product of claim 8, wherein the all engine maximum thrust operation is based on a drag component, a weight component, and an all engines at maximum thrust component.

10. A ground proximity warning system comprising:

a component configured to determine aircraft current climb rate and potential climb rate based on aircraft vertical speed data and velocity information;

a component configured to add the determined current climb rate and potential climb rate; and a component configured to disable alerts, if the sum of the current climb rate and potential climb rate differ from a predetermined climb rate by a threshold amount.

11. The system of claim 10, wherein the predetermined climb rate is based on all engine maximum thrust operation.

12. The system of claim 11, wherein the all engine maximum thrust operation is based on a drag component, a weight component, and an all engines at maximum thrust component.

\* \* \* \* \*